US006531213B1

(12) United States Patent
Yoshie et al.

(10) Patent No.: US 6,531,213 B1
(45) Date of Patent: *Mar. 11, 2003

(54) RECYCLABLE IMAGE-RECORDING MEDIUM, SURFACE OF WHICH HAS SPECIFIED SATURATED SWELLING AMOUNT

(75) Inventors: Naoki Yoshie, Kyoto (JP); Chiaki Yamaoka, Kyotanabe (JP); Toshimitsu Fujiwara, Osaka (JP)

(73) Assignee: Minolta Co, Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/480,457

(22) Filed: Jan. 11, 2000

(30) Foreign Application Priority Data

Jan. 13, 1999 (JP) .......................................... 11-006342
Jan. 26, 1999 (JP) .......................................... 11-016790

(51) Int. Cl.7 ................................................ B32B 5/16

(52) U.S. Cl. .................... 428/336; 428/323.1; 428/412; 428/413; 428/423.1; 428/480; 428/500

(58) Field of Search ............................ 428/336, 411.1, 428/423.1, 423.7, 424.4, 424.6, 424.7, 474.4, 323.1, 323, 500, 480, 412, 413

(56) References Cited

U.S. PATENT DOCUMENTS

| | | | | |
|---|---|---|---|---|
| 5,474,617 | A | | 12/1995 | Saito et al. .................... 134/15 |
| 5,738,759 | A | | 4/1998 | Kitazawa et al. ........... 162/135 |
| 5,876,847 | A | | 3/1999 | Mitsuhashi et al. .......... 428/336 |
| 5,968,301 | A | * | 10/1999 | Murakami et al. ........... 156/230 |

FOREIGN PATENT DOCUMENTS

| | | |
|---|---|---|
| EP | 0 601 502 A2 | 6/1994 |
| JP | 07311523 | 11/1995 |
| JP | 09104197 | 4/1997 |

OTHER PUBLICATIONS

Grant, Grant and Hackh's Chemical Dictionary, 1987, McGraw–Hill, $5^{th}$ ed, p564.

* cited by examiner

*Primary Examiner*—Paul Thibodeau
*Assistant Examiner*—Christopher Paulraj
(74) *Attorney, Agent, or Firm*—Burns, Doane, Swecker Mathis, LLP

(57) ABSTRACT

The present invention relates to a recyclable recording medium comprising;

a base member, a surface layer comprising a water-swelling resin, and having a thickness of 3 to 30 μm;

a saturated swelling amount in the direction of thickness is 4 to 25 μm when the recyclable recording medium is immersed in an aqueous medium.

39 Claims, 5 Drawing Sheets

RECYCLABLE IMAGE-RECORDING MEDIUM, SURFACE OF WHICH HAS SPECIFIED SATURATED SWELLING AMOUNT

This application is based on application(s) No. Hei 11-006342 and Hei 11-016790 filed in Japan, the contents of which are hereby incorporated by reference.

BACKGROUND OF THE INVENTION

1. Field of the Invention

The present invention relates to an image-recording medium capable of being reused repeatedly wherein a printed material made to adhere to the image-recording medium by image formation in a copying machine, a printer or the like is removable from the image-recording medium.

2. Description of the Related Art

Electrophotographic copying techniques using toners (so called copy simply) are popular now. Image-recording media such as paper and OHP sheets are used in large quantities.

Printed materials printed or copied on such image-recording media are not easily removed. Techniques for removing such printed materials are not yet ready for practical use. It is true that printed materials generated in large quantities in offices are discarded when they become unnecessary.

This is clearly not desirable from the viewpoint of environmental protection and natural resource preservation. Therefore, researches on techniques for reproducing or recycling image-recording media which would otherwise be discarded have been vigorously conducted. U.S. Pat. No. 5,738,759 and EP0601502, for example, disclose methods wherein a swelling layer which swells by absorbing water is formed on the surface of an image-recording medium and images printed on the image-recording medium are removed by swelling the swelling layer with water.

The recording medium swells when immersed in an image-removing solution such as water, so that a volume of the recording medium changes. The printed materials, such as toner, printed on the recording medium do not swell generally in the image-recording solution. Therefore, a shearing force generates at an interface between the recording medium and the printed materials as the volume of the recording medium changes. As a result, the printed materials become easy to separate from the recording medium. When physical frictional force, such as brushing, is applied to the printed materials, they can be removed completely.

However, the above techniques have problems on insufficient removal of printed materials and durability and can not satisfy the technical properties such as removing properties of printed materials and durability required by a recyclable recording medium.

SUMMARY OF THE INVENTION

An object of the present invention is to provide a recyclable image-recording medium excellent in both printed image-removing properties and durability.

Another object of the present invention is to provide a recyclable image-recording medium with high durability, in which printed materials, such as toner, can be removed speedily.

The above object can be achieved by a recyclable recording medium comprising;

a base member, a surface layer comprising a water-swelling resin, and having a thickness of 3 to 30 μm;

a saturated swelling amount in the direction of thickness is 4 to 25 μm when the recyclable recording medium is immersed in an aqueous medium.

DETAILED DESCRIPTION OF THE INVENTION

The present invention relates to a recyclable recording medium comprising;

a base member, a surface layer comprising a water-swelling resin, and having a thickness of 3 to 30 μm;

a saturated swelling amount in the direction of thickness is 4 to 25 μm when the recyclable recording medium is immersed in an aqueous medium.

Figure 1:
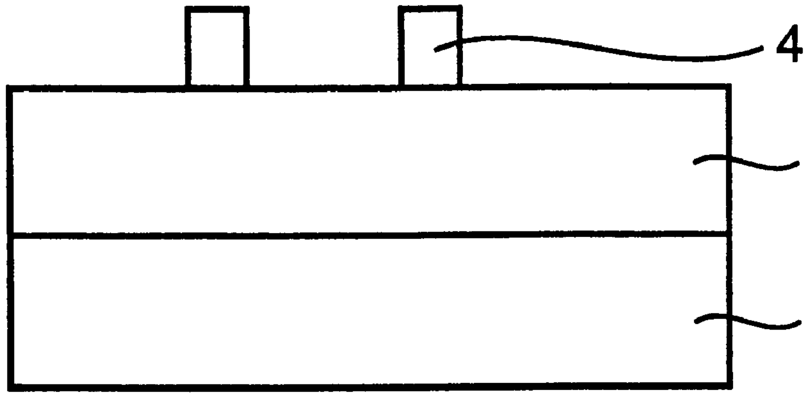
FIG. 1 is a schematic cross sectional view of an embodiment of an image-recording medium.

FIG. 1 shows a schematic cross sectional view of one embodiment of an image-recording medium. As shown in FIG. 1, the image-recording medium has a surface layer 3 laminated on a base member 1. In the structure shown in FIG. 1, a printed material 4 is printed on the surface of the surface layer 3. In the structure shown in FIG. 1, the surface layer 3 is formed on one side of the base member 1. Alternatively, the surface layer 3 maybe formed on both sides thereof.

As a base member 1, a transparent plastic film that has water-resistance (strength), or a plastic film opacified by adding inorganic fine particles, is used advantageously. The material of the plastic film is not specifically limited. When heat resistance, for example, is considered, polyester, polycarbonate, polyimide, polymethylmethacrylate, etc. are preferred. When versatility, price, heat resistance, durability, etc. are further considered, polyester, in particular, polyethylene terephthalate (PET), polyethylene naphthalate (PEN), etc. are desirable. Various sheets available as OHP sheets can also be used. In addition, plastic-base paper and other synthetic paper made from plastic fibers such as PET fibers are available in the market. These paper sheets can be used as the base member. Metal foils, paper with improved water-resistance, and even composite materials made from resin, paper, and metal can also be used. Other materials may be used so far as the material has water-resistance and appropriate mechanical strength and is able to keep its flatness throughout the printing and removal of printed materials.

The surface layer formed on the base member comprises a water-swelling resin. Water-swelling means to swell with water or an aqueous solvent but not dissolve in it. The water-swelling resin may be produced by crosslinking a water-soluble resin. A water-insoluble component may be added to a water-soluble resin to yield the properties to absorb a water or other solvent to swell without dissolving in the solvent.

A water-soluble resin used in the present invention is the one having in a molecule a functional group crosslinkable with a crosslinking agent (explained later) (referred to as "crosslinking functional group" hereinafter). The crosslinking functional group may be exemplified by a hydroxyl group, an amino group, an amide group, a thiol group, a carboxyl group, or a sulfonic group. The water-soluble resin having such a crosslinking functional group may be exemplified by polyvinyl alcohol, methyl cellulose, polyacrylic acid, carboxymethyl cellulose, hydroxyethyl cellulose, polyvinyl pyrrolidone, polyacrylamide, and diacetone polyacrylamide. Preferably, polyvinyl alcohol, methyl cellulose, or polyacrylic acid is used. Among them, it is preferable to use a water-soluble resin having polyvinyl alcohol which has many hydroxyl groups.

A polymerization degree of the water-soluble resin used in the present invention has preferably 300 to 10,000, more preferably 300 to 3,000, still more preferably 500 to 2,000. It is appropriate for use that such a water-soluble resin of 2 to 30 parts by weight, preferably 5 to 10 parts by weight, is dissolved in an aqueous solvent of 100 parts by weight.

It is preferable to use a water-soluble resin having an ionic functional group (referred to as "ionic group" hereinafter). The ionic group means that nearly 100% of it dissociates in water to generate negative and positive ions. The ionic group maybe an an ionic functional group or a cationic functional group. The anionic functional group may be an anionic substituent and be exemplified by a carboxyl group with an active hydrogen atom substituted by a metal atom, a sulfonic group with an active hydrogen atom substituted by a metal atom, the above-mentioned crosslinking functional group with an active hydrogen atom substituted by a substituent having at the end a carboxyl group with an active hydrogen atom substituted by a metal atom, a sulfonic group with an active hydrogen atom substituted by a metal atom. The cationic functional group may be a cationic substituent and exemplified by a quaternary amino group and the above-mentioned crosslinking functional group with an active hydrogen atom substituted by a substituent having at the end a quaternary amino group. The above mentioned crosslinking functional group such as a hydroxyl group, an amino group, an amide group, a thiol group, a carboxyl group, or a sulfonic group are not included by the ionic group as they dissociate a little.

A resin having both the crosslinking functional group and the ionic group may be exemplified by a copolymer of acrylic acid and acrylate salt, a copolymer of vinyl alcohol and acrylate salt, a copolymer of vinyl alcohol and acrylate having a quaternary ammonium salt at the end and copolymer of hydroxyalkyl acrylate (metacrylate) and acrylate salt.

The water-soluble resin having both the crosslinking functional group and the ionic group may be produced by copolymerizing a monomer having a crosslinking functional group with a monomer having an ionic group (ionic monomer). Any monomer having a crosslinking functional group can be used so far as it has the above mentioned crosslinking functional group and is reactive with the ionic monomer (exemplified below), being exemplified by hydroxyethyl acrylate, hydroxyethyl methacrylate, acrylamide, acrylic acid, methacrylic acid, maleic acid, fumaric acid. They may be used in combination.

The ionic monomer may be exemplified by sodium acrylate, sodium methacrylate, quarternary dimethylaminoethyl methacrylate, quarternary dimethylaminoethyl acrylate, quarternary diethylaminoethyl methacrylate, quarternary diethylaminoethyl acrylate, monosodium maleate, monosodium fumarate, disodium maleate, disodium fumarate, and a mixture thereof.

The monomer having the crosslinking functional group and the ionic monomer are used for polymerization so that a ratio in number (CG:IG) of all the crosslinking functional groups (CG) to all the ionic groups (IG) in the resultant water soluble resin may be 5:5 to 100:1, preferably 2:1 to 20:1. If the number ratio of the ionic groups is too small, a water-absorbing rate becomes low, possibly resulting in failure to get a desired removing rate of printed materials. If the number ratio of the ionic groups is too large, the water-swelling resin dissolves out of the member, possibly resulting in poor removal of printed materials. The water-soluble resin of the present invention is formed to have a polymerization ratio of monomers, that is, a monomer charge ratio. Therefore, the number ratio (CG:IG) of all the crosslinking functional groups (CG) to all the ionic groups (IG) in the resultant water soluble resin can be adjusted by controlling the monomer charge ratio.

The water-soluble resin having both the crosslinking functional group and the ionic group may be prepared by preparing once a resin having the crosslinking functional group and then introducing the ionic groups into the resin, or by preparing once a resin having the ionic groups and then introducing the crosslinking functional group into the resin. In this case, it is desirable that the number ratio (CG:IG) of all the crosslinking functional groups (CG) to all the ionic groups (IG) in the resultant water soluble resin is within the range above. In the present invention, the anionic or cationic water-soluble resin available in the market, for example, anion-modified polyvinyl alcohol (KM-618, made by Kuraray K.K.), and cation-modified polyvinyl alcohol (CM-318, made by Kuraray K.K.) may be used.

The above water-soluble resin has at least one crosslinking functional group or ion group per monomer unit which forms the resin. The water-soluble resin used in the present invention is not limited to the above. The water-soluble resin used in the present invention includes the ones formed with monomer units having neither crosslinking functional group nor ion group so that the resin have 50 or less, or 30 or less of crosslinking functional groups or ion groups per 100 monomer units. If the number of the monomer unit having neither crosslinking functional group nor ion group exceeds 50 per 100 monomer units, the desired water-solubility may not be achieved.

The water-soluble resin containing a monomer unit having neither crosslinking functional group nor ion group can be produced by copolymerizing a monomer having a crosslinking functional group, monomer having an ionic group, and a monomer having neither crosslinking functional group nor ion group. The same monomer having a crosslinking functional group and the same ioninc monomer as described above may be used. Any monomer having neither crosslinking functional group nor ion group may be used so far as it does not contain neither crosslinking functional group nor ion group and is polymerizable with the monomer having a crosslinking functional group and the ioninc monomer, being exemplified by methyl acrylate, methyl methacrylate, ethyl acrylate, ethyl methacrylate, vinyl acetate and vinyl chloride.

The monomer having a crosslinking functional group, the ioninc monomer and the monomer having neither crosslinking functional group nor ion group are used for polymerization so that the number of the monomer unit having neither crosslinking functional group nor ion group per 100 monomer units in the resultant water-soluble resin is within the range above mentioned and that a ratio in number (CG:IG) of all the crosslinking functional groups (CG) to all the ionic groups (IG) in the resultant water-soluble resin is also within the range above mentioned.

The water-soluble resin containing monomer units having neither crosslinking functional group nor ion group may be produced by preparing once a resin with the monomer having neither crosslinking functional group nor ion group and then introducing the crosslinking functional group and the ionic groups into the resin. It is desirable that the number of the monomer unit having neither crosslinking functional group nor ion group per 100 monomer units in the resultant water-soluble resin is within the range above mentioned and that a ratio in number (CG:IG) of all the crosslinking functional groups (CG) to all the ionic groups (IG) in the resultant water-soluble resin is also within the range above mentioned.

In order to crosslink the water-soluble resin, a crosslinking agent and, if necessary, an initiator is added to the aqueous solution of the resin. Any crosslinking agent may be used as long as it has reactivity with the functional groups, such as a hydroxyl group, an amide group, a carboxyl group, etc., contained in the water-soluble resin molecules, and is capable of crosslinking the water-soluble resin. Examples include epoxy compounds, isocyanate compounds, glyoxals, methylol compounds, melamine compounds (melamine resins), dicarboxylic acids, aziridines, dihydrazides etc.

When the water-soluble resin is made insoluble by adding a water-insoluble component, it is preferable that a monomer or an oligomer having two or more vinyl groups and their polymerization initiator are added to a resin solution and the insoluble component is formed by heat polymerization or ultraviolet (UV) radiation curing.

Examples of the monomer or oligomer having two or more vinyl groups include diacrylates, dimethacrylates, and urethane acrylate-base memberd monomers or oligomers.

Examples of epoxy compounds include polyethylene glycol diglycidyl ether, polypropylene glycol diglycidyl ether, sorbitol polyglycidyl ether, sorbitan polyglycidyl ether, and polyglycerol polyglycidyl ether. Various other epoxy compounds can also be used.

For isocyanate compounds, a compound containing two or more isocyanate groups within one molecule can be used. Using a compound containing a plurality of isocyanate groups, the base member and the surface layer can be bonded together more firmly.

Such isocyanates include, for example, 4,4'-diphenylmethane di-isocyanate, 4,4'-methylene biscyclohexyl isocyanate, tris(p-isocyanatephenyl)thiophosphate, tris(p-isocyanatephenyl)methane, adduct of trimethylolpropane with three tolylene di-isocyanates, and aliphatic polyisocyanates containing a hydrophilic group within molecule.

The isocyanates used in the present invention, including the above listed compounds, may be protected by phenol, sulfurous acid, etc.

Examples of methylol compounds include methylol melamines such as dimethylol melamine and trimethylol melamine, dimethylol ureas, and melamine-formaldehyde resins. Various other methylol compounds can also be used; those having an appropriately high molecular weight and appropriately long molecular chain are more preferable. From this point of view, melamine-formaldehyde resins are most preferable among the above listed methylol compounds.

Examples of aldehyde compounds include glyoxal and glutaraldehyde. Various other aldehyde compounds can also be used.

Examples of aziridine compounds include, for example, diphenylmethane-bis-4,4'-N,N'-diethyl urea and 2,2-bishydroxylmethylbutanol-tris-[3-(1-aziridinyl)propionate]. Polymers containing an oxazoline group can also be used.

A surfactant may be added in the surface layer in order to improve coating properties of the resin solution for forming the surface layer.

Any surfactant, which may be anionic, cationic or nonionic, may be used. A usage thereof is 0.1 to 20% by weight, preferably 0.5 to 10% by weight relative to the resin.

Inorganic fine particles, such as silica, titanium oxide, alumina, zinc oxide and calcium carbonate, or fine resin particles, such as acrylic resin, styrene resin, may be added to the surface layer to improve writing or printing properties. When such inorganic fine particles are added, 0.5 to 200 parts by weight, preferably 3 to 30 parts by weight, is added per 100 parts by weight of the water-soluble resin.

If desired, an antistatic treatment may be applied to the surface layer in order to enhance paper-feeding ability. The antistatic agent may be added to the surface layer, or may be dissolved and dispersed in a suitable solvent and applied after the surface layer is formed. The antistatic agent may be exemplified by a cationic surfactant such as quaternary ammonium salt.

A solvent-coating method can be used to form the surface layer. To describe more specifically, the water-soluble resin, crosslinking agent, monomer or oligomer, other additives, if necessary, are dissolved and/or dispersed in a suitable solvent such as water, a water/organic mixed solvent, or an organic solvent, and the resulting solution is applied onto the base member to form a layer thereon.

After application, the surface layer is heated at 50 to 180° C. If the compounds having a double bond is polymerized, the heat treatment is carried out after irradiation or with irradiation.

In the present invention, it is necessary that the surface layer is formed so that a saturated swelling amount in the direction of the thickness can be between 4 $\mu$m and 25 $\mu$m when the recording medium is immersed in water. Thereby, the objects of the present invention, or a recording medium excellent in durability and removing properties of printed materials can be achieved.

If the saturated swelling amount in the direction of the thickness is small than 4 $\mu$m, a sufficient stress is not applied to the interface between the recording medium and printed materials. If the surface layer of the recording member has more than 25 $\mu$m in a saturated swelling amount in the direction of the thickness, there is no problem with respect to removal of printed materials, however, a load applied to the recording member is so large that degradation of the recording member is high, resulting in elution and separation of the surface layer in the recycling process. Preferable saturated swelling amount is within 5 to 20 $\mu$m, preferably 6 to 15 $\mu$m.

The saturated swelling amount in the direction of the thickness means as follows in the present invention. The recording medium is immersed for a specified time in a swelling solution containing an aqueous solvent, such as water, a mixed solvent of water with an aqueous organic solvent and an aqueous organic solvent, and a desired additive such as a surfactant. The surface layer is made to swell sufficiently until no more swelling to be in steady state. A difference between pre-swelling and post-swelling is measured by a micrometer. The measurement is made randomly at 30 portions with 3 cm or more separate from each other when converted to A4 size area. The average of the values (μm) is referred to a saturated swelling amount in the direction of the thickness in the present invention. As the base member is considered not to swell, the saturated swelling amount in the direction of the thickness is considered to represent the one of the surface layer. The time required to reach saturation state of swelling is determined individually depending on properties of surface layer, a kind of swelling solution etc.

A swelling solution is supplied to the surface layer. Such a swelling solution as can swell the surface layer may be an aqueous solution, such as water, a mixed solvent of water with an aqueous organic solvent and an aqueous organic solvent. The swelling solution may contain a desired additive, such as a surfactant. In the present invention, it is a great advantage that the printed materials can be removed with water. In the following description, the case of use of water is described.

The saturated swelling amount in the direction of the thickness varies in proportion to the phase thickness even if the swelling ratio of the materials constituting the surface layer is same. When layer thickness is large, a required saturated swelling amount in the direction of the thickness may be obtained even if a swelling ratio is small. To the contrary, when layer thickness is thin, a required saturated swelling amount in the direction of the thickness may not be obtained even if a swelling ratio is large. In the present invention, both factors or the thickness of surface layer and the swelling ratio may participate. If the surface layer is thin, a sufficient saturated swelling amount in the direction of the thickness can not be achieved and the printed materials may not be removed sufficiently. Therefore, the surface layer is formed so that a thickness thereof is 3 to 30 μm, preferably 5 to 20 μm. If the thickness of the surface layer is low, a sufficient saturated swelling amount in the direction of the thickness can not be obtained, so that the printed materials can not be removed sufficiently. If the thickness of the surface layer is high, the strength of the layer becomes small, resulting in such a problem as durability caused by phase separation, injuries of the phase.

The saturated swelling amount in the direction of the thickness can be controlled, for example, by an addition amount of the crosslinking agent contained in the surface layer. The crosslinking agent works to bond chains (straight or somewhat branched) of resin molecules to restrain the freedom of the chains. The resin molecule chains are bonded to the crosslinking agent each other to form block portion. A solvent such as water is absorbed into the block portions, swelling proceeds. When the unit of block is made large, a large amount of solvent can be absorbed, so that the saturated swelling amount in the direction of the thickness may increase.

In general, when an amount of the crosslinking agent is decreased, the number of crosslinking points which yoke resin molecules decreases, resulting in increase in the saturated swelling amount in the direction of the thickness. If an amount of the crosslinking agent is increased, the resin molecules are strongly restrained, resulting in decrease in the saturated swelling amount in the direction of the thickness. As the swelling degree may depend on resins, kinds of crosslinking agents, molecular weight, reactive conditions, an addition amount of the crosslinking agent can not be specified generally, but the swelling amount of the surface layer can be controlled by adding the crosslinking agent at an amount within the range between 1 and 50 parts by weight, preferably 1.5 and 40 parts by weight on the basis of 100 parts by weight of the resin. If the addition amount is too low, the layer is lack in strength at swelling and the layer may be dissolved. If the addition amount is too large, a sufficient saturated swelling amount in the direction of the thickness can not be obtained.

When the water-soluble resin having both the crosslinking functional group and the ion group is used, it is preferable that a ratio of the number of the crosslinking functional groups and the number of the functional groups of the crosslinking agent in the water-soluble resin (functional groups of the crosslinking agent/crosslinking functional groups) is within the range between 1/100 and 1/5, preferably 1/50 and 1/8.

The ratio may be set up in the above range before the crosslinking reaction and can be controlled by a kind or usage of a resin and crosslinking agent supplied to the crosslinking reaction. After the crosslinking reaction, 1/100 to 1/5, preferably 1/50 to 1/8 of the crosslinking functional groups in the resulting water-soluble resin are crosslinked by the crosslinking agent. If the ratio of the number of the functional groups of the crosslinking agent to the number of the crosslinking functional groups in the resin is less than 1/100, a crosslink density is so low that the surface layer is liable to dissolve and strength is lost. The elastic modulus of the resultant surface layer becomes low and the stress is hardly applied in the image-removing process, resulting in poor image-removing properties. If the ratio is more than 1/5, a crosslink density is so high that there is little spaces where water is absorbed, resulting in deterioration of toner-removing properties.

Other than the control of the swelling amount by the crosslinking agents, the swelling amount may be controlled by any other factors so long as the sufficient saturated swelling amount in the direction of the thickness specified in the present invention can be achieved while keeping layer strength and durability. For example, a hydrophilic group or hydrophobic group may be incorporated into the resin or the crosslinking agent, or molecular weight is changed, so that the size of blocks can be varied.

An intermediate layer may be formed between the base member and the surface layer. The intermediate layer is formed in order to adhere the surface layer stronger to the base member.

Figure 2:
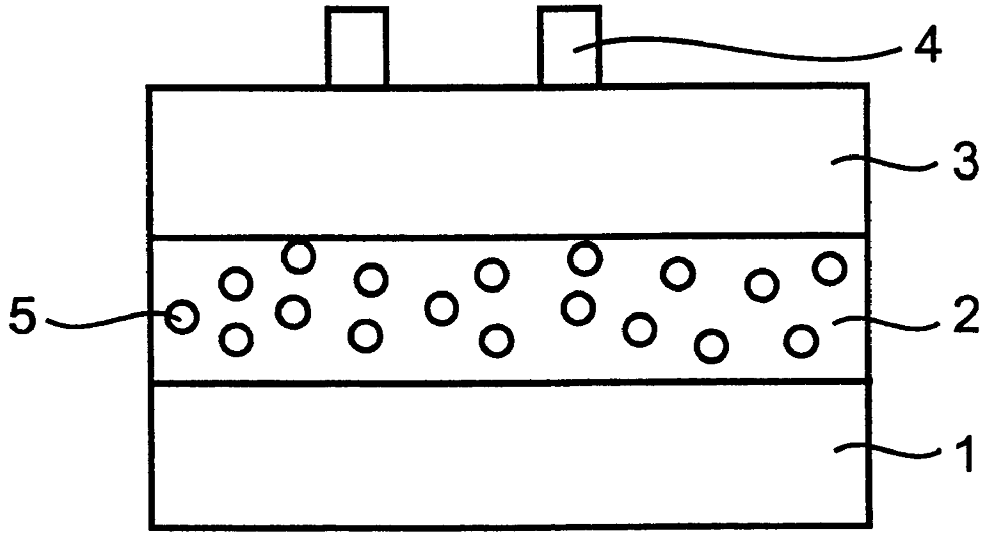
FIG. 2 is a schematic cross sectional view of another embodiment of an image-recording medium.

FIG. 2 shows a schematic cross sectional view of another embodiment of the image-recording medium having the intermediate layer. Reference number 1 is a base member, 2 is an intermediate layer, 3 is a surface layer. In the structure shown in FIG. 2, a printed material 4 is printed on the surface of the surface layer 3. In the structure shown in FIG. 2, the intermediate layer 2 and the surface layer 3 are formed on one side of the base member 1. Alternatively, the intermediate layer 2 and the surface layer 3 may be formed on both sides thereof.

The intermediate layer 2 is formed from a resin with high adhesive properties. The intermediate layer may contain a compound (reactive compound) 5 having a functional group chemically bondable to the surface layer-forming resin, if desired. Thereby, the adhesive properties or bonding properties between the intermediate layer and the surface layer can be improved.

Examples of the resin with high adhesive properties for forming the intermediate layer 2 include acrylic resins, styrene resins, polyester resins, polycarbonate resins, vinyl acetate resins, vinyl chloride resins, urethane resins, etc., among which polymethyl methacrylate resins, polyester resins, polycarbonate resins, vinyl chloride resins, and urethane resins are preferable. In particular, resins having high adhesivity to the base member are preferred for use.

The reactive compound contained in the intermediate layer is not limited to a specific compound as long as it has a functional group capable of chemically bonding to the surface layer-forming resin. For example, methylol compounds, isocyanate compounds, aldehyde compounds, epoxy compounds, aziridine compounds, etc. can be used. When the surface layer-forming resin is a resin having a hydroxyl group, such as polyvinyl alcohol or methyl cellulose, methylol compounds, isocyanate compounds, aldehyde compounds, and epoxy compounds are preferred. When the surface layer-forming resin is a resin having a carboxyl group, such as polyacrylic acid, then isocyanate compounds, epoxy compounds, and aziridine compounds are preferred. The same compounds as those used as the crosslinking agent for crosslinking the water-soluble resin to form the surface layer can be used.

Among the above described reactive compounds, the compounds that are in the form of a solid or wax at normal temperatures or in the form of a viscous liquid at normal temperatures are more preferable. When the reactive compound is in the form of a solid or wax or a viscous liquid at normal temperatures, the advantage is that the compound does not evaporate by drying in the process of forming the intermediate layer and, also, the surface does not become sticky after drying, which makes the surface coating easier. Further, when the reactive compound soluble in water or having affinity for water is used, there is no need to use an organic solvent when forming the intermediate layer, which serves to prevent an organic solvent from remaining in the intermediate layer.

In order to apply the intermediate layer 2 onto the base member 1, a solution-coating method, a melt-coating method etc. can be employed. In the solution-coating method, a solution prepared by dissolving the resin and, if necessary, the reactive compound in a suitable solvent, such as tetrahydrofuran (THF), dioxane, acetone, ethyl acetate or methyl ethyl ketone (MEK), is applied and dried. A solution of a water-soluble or hydrophilic polyurethane, polyester, or other resin dispersed or dissolved in water can also be used. Such resin solutions and resin emulsions are commercially available. Such solutions or emulsions have the advantage that the coating can be performed without use of an organic solvent, especially, a nonaqueous organic solvent. This effects to improve the safety during manufacturing. This also effects to prevent problems such as generation of residual solvent gases from within the image-recording medium when it is fed, for example, into a copying machine and heated. The use of an aqueous solvent has an effect of facilitating the application of the intermediate layer when a surface active agent is added. When both the intermediate layer and the surface layer are formed by use of an aqueous solvent, it becomes possible to prepare an image-recording medium without use of a non-aqueous organic solvent. Safety is secured and the remaining of the non-aqueous organic solvent in the image-recording medium may be avoided. By means of the solution-coating method or the melt-coating method described above, the intermediate layer is formed to have a layer thickness of about 0.5 μm to 20 μm, preferably about 0.5 μm to 10 μm, more preferably about 0.5 μm to 6 μm. If the thickness is less than 0.5 μm, coating irregularities tend to occur, more likely to result in the formation of uncoated portions. If the thickness exceeds 20 μm, problems may arise in strength and heat resistance etc. of the image-recording medium.

The reactive compound can itself be dissolved in a solvent or the like and then applied and dried for formation of the intermediate layer, when it is a high molecular weight compound that has a layer-forming capability by itself and excellent adhesivity to the base member. When adding the compound to the resin solution for coating, 5 to 50 parts by weight of the reactive compound may be added per 100 parts by weight of the intermediate layer-forming resin.

Further the intermediate layer may be subjected to a corona discharge treatment.

When paper or fibrous base member is used, the base member may be immersed in a coating solution for formation of the intermediate layer, thereby impregnating the base member material with the coating solution and filling the intermediate layer-forming material through fibers of the base member material.

The above obtained image-recording medium can be used repeatedly in a recycling system in which a printed image-removing method involves the processes of a surface layer-swelling process, a physical friction process, such as brushing, and a drying process.

The following describes a method for removing a printed material from an image-recording medium whose surface is printed with a printed material such as toner. This method comprises the step of feeding the image-recording medium printed with a printed material to a swelling solution capable of swelling the surface layer, and the step of scraping the printed material from thee swollen surface of the image-recording medium by a physical force. The method will be further described in detail with reference to figures.

Figure 3:
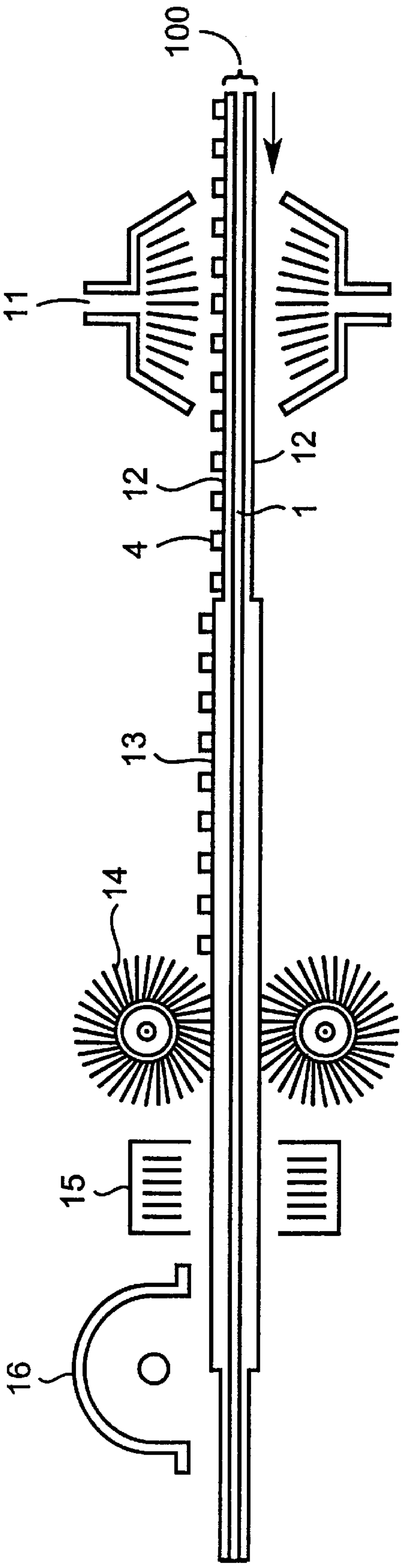
FIG. 3 is a process sequence diagram for explaining a printed material removing method.

FIG. 3 is a process sequence diagram for explaining one example of the printed material-removing method. In FIG. 3, an intermediate layer and a surface layer are formed on both sides of the image-recording medium 100. The intermediate layer and the surface layer are designated in to by reference number 12. The surface of the image-recording medium is printed with a material for printing 4 such as toner. Toner used in electrophotography is preferably used as the material for printing. Other types of materials for printing can also be used, including such materials for printing as used in an ink jet method in which hot-melt ink is used, a thermal transfer method, or other printing processes. Other types of materials for printing, such as oil paint, that adheres to the surface of an image-recording medium to form a veliform image. The image-recording medium is transported from right to left in the figure.

First, the image-recording medium printed with the printed material 4 is supplied on its surface layer with a surface layer-swelling solution from a solvent supplier 11. Various solutions, including an aqueous solvent such as water or a mixed solvent of water and a water-soluble organic solvent, or an aqueous organic solvent, can be used as the solvent capable of swelling the surface layer. An additive such as a surfactant may be added to the solvent. In this way, the present invention has a great advantage in that the printed material can be removed with water. The following description deals with the case in which water is used.

Water may be supplied by spraying a shower of water over the surface layer from a shower device 11, as shown in FIG. 3. The surface layer maybe immersed in water (not illustrated in the figure). It is preferable to expose the surface layer to water for about 15 to 150 seconds to allow water to soak into the surface layer of the image-recording medium to such a degree as the printed materials are removable. As the contact time increases, the water can be made to soak sufficiently, but the processing time increases correspondingly. When the water soaks into the surface layer of the image-recording medium, the surface layer swells (the swollen surface layer is shown by reference number 13) and the adhesion between a printed material 4 and the surface layer decreases. At this time, it is appropriate that the water temperature is kept at 15° C. to 45° C. If the temperature. is to high, the amount of water evaporation increases. If the temperature is too low, a sufficient cleaning effect may not be obtained.

After the water has sufficiently soaked through the surface layer, the image-recording medium is transported to a printed material-removing region where a brush 14 is applied. The brush 14 is rotating so that the printed material 4 on the image-recording medium 100 is removed by the brush. A removing means other than the brush may be used, for example, a means such as a blade or a cloth that rubs or scrapes the surface by applying a physical or mechanical force to the surface. In FIG. 3, the brush 14 is disposed away from the liquid, but may be placed in the liquid. A length of the brush 14 may be about 5 mm to 20 mm and the thickness about 10 $\mu$m to 60 $\mu$im. The material is not specifically limited, but nylon or the like is suitable.

The paper feed speed, i.e., the speed at which the image-recording medium passes under the brush 14, is determined by considering the balance between the processing time and the cleaning performance; for example, the speed is set within the range of 0.5 cm/second to 5 cm/second. Preferably, the rotational speed of the brush is set at five or more times the transport speed, and more preferably at 10 or more times.

After the printed material 4 has been removed, the image-recording medium is transported to a shower region where a cleaning shower 15 is supplied to the surface of the image-recording medium to wash out any remaining printed material on the surface of the image-recording medium. An aqueous solvent similar to the one used to swell the surface may be used as the liquid for the shower 15. It is particularly preferable to use water.

After subjected to the shower 15, the image-recording medium is transported to a drying region where it is dried by a dryer 16. The drying method may be accomplished either by a contact type such as a heat roller or by a noncontact type such as a far infrared lamp. A heating temperature is suitably in the range of 70 to 150° C.

Figure 4:
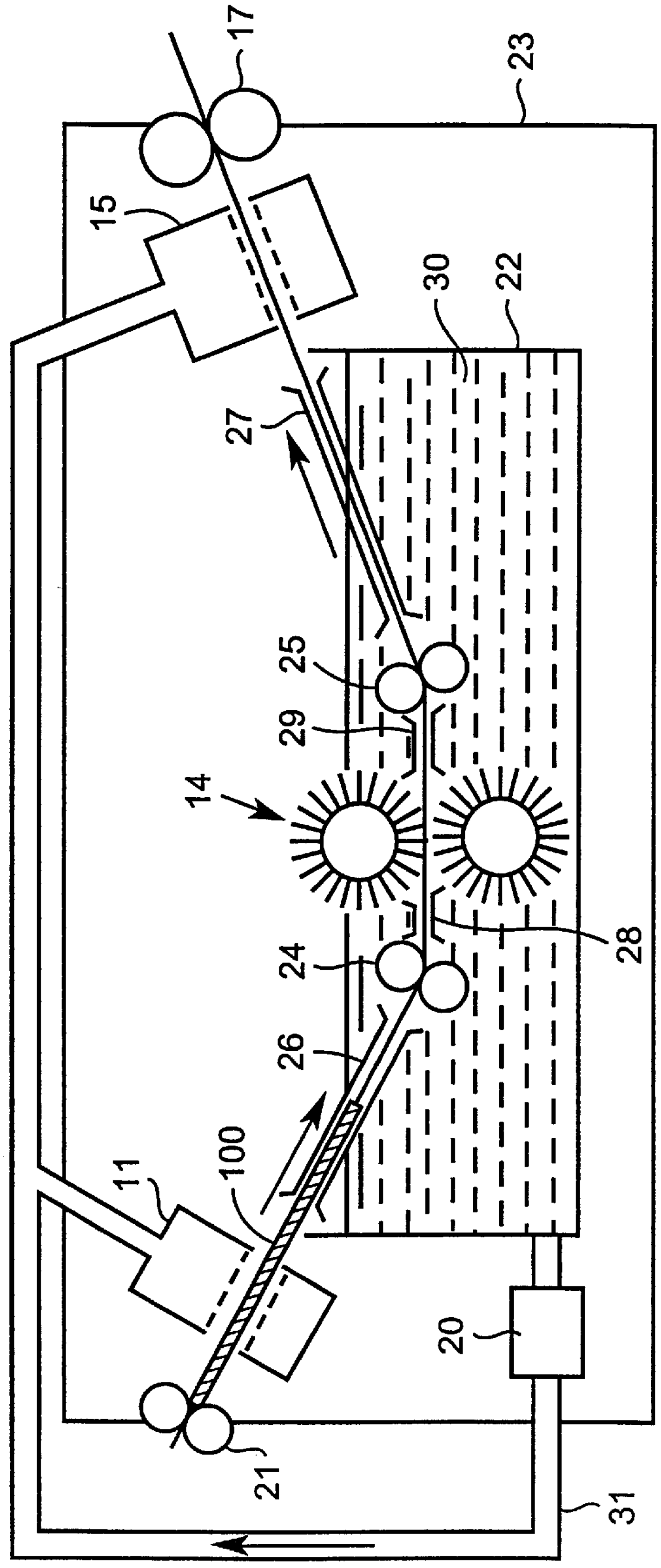
FIG. 4 is a schematic view showing one example of a cleaning apparatus.

FIG. 4 is a diagram showing one embodiment of a cleaning apparatus to which the above described cleaning method can be applied. The apparatus of FIG. 4 includes a cleaning tank 22, mounted inside a casing 23, for accommodating a liquid 30 for swelling the image-recording medium. To the cleaning tank 22 is connected a pump 20 equipped with a filter for removing the printed material in the liquid in the tank, and the pump 20 is further connected via a pipe 31 to a swelling shower 11 and a rinsing shower 15.

The liquid in the cleaning tank 22, after being purified by the filter in the pump 20, is fed through the pipe 31 to the showers 11 and 15, and is used as a liquid for swelling the image-recording medium in the shower 11 and as a liquid for rinsing in the shower 15.

The image-recording medium is fed into the apparatus by means of a paper feeding roller 21 and sprayed with the liquid for swelling from the shower 11. Then, the image-recording medium is transported via a guide 26 and a transport roller 24 and immersed in the liquid 30 in the cleaning tank 22. After immersed for a prescribed period of time, the image-recording medium is fed by means of the transport roller 24 and a guide 28 to a position facing to the brush 14, where the printed material is removed.

The image-recording medium is, then, transported via a guide 29, a transport roller 25, and a guide 27, is sprayed with the rinsing liquid from the shower 15, and is finally dried by a drying roller 17 and discharged to the outside of the apparatus.

Figure 5:
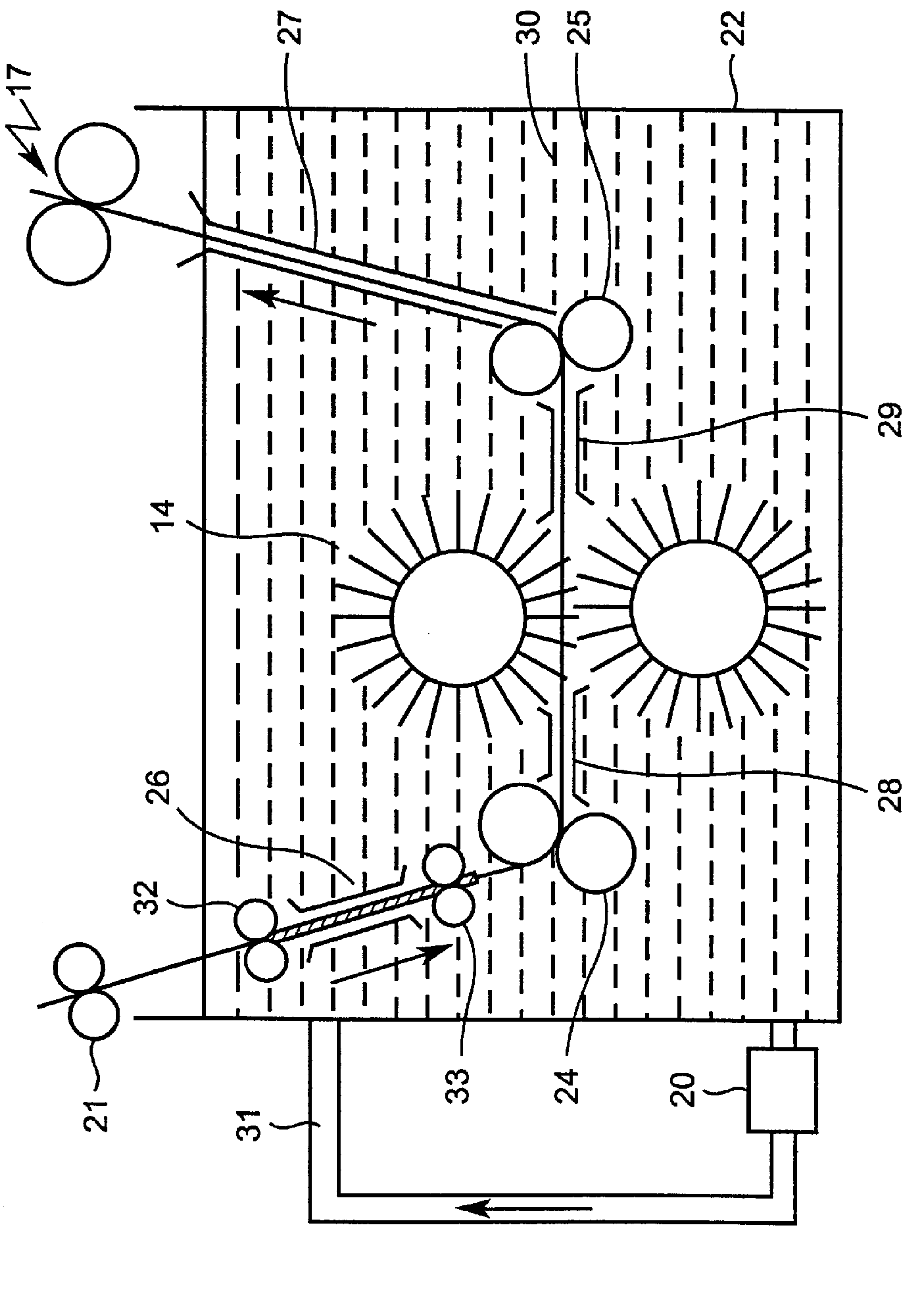
FIG. 5 is a schematic view showing one example of a cleaning apparatus.

FIG. 5 is a diagram showing another embodiment of the cleaning apparatus. In the apparatus of FIG. 5, the image-recording medium fed by means of a paper feed roller 21 is transported directly into a cleaning tank 22 by means of transport rollers 32, 33 and a guide 26, and immersed in a liquid 30 to allow water to soak into the surface layer of the image-recording medium before brushing. After passing the position facing to a brush 14, the image-recording medium is passed through the liquid 30 for a prescribed period of time before being fed to a drying roller 17, thereby obtaining the rinsing effect. The same components as those in FIG. 4 are designated by the same reference numbers, and detailed explanations of such components are omitted.

Figure 6:
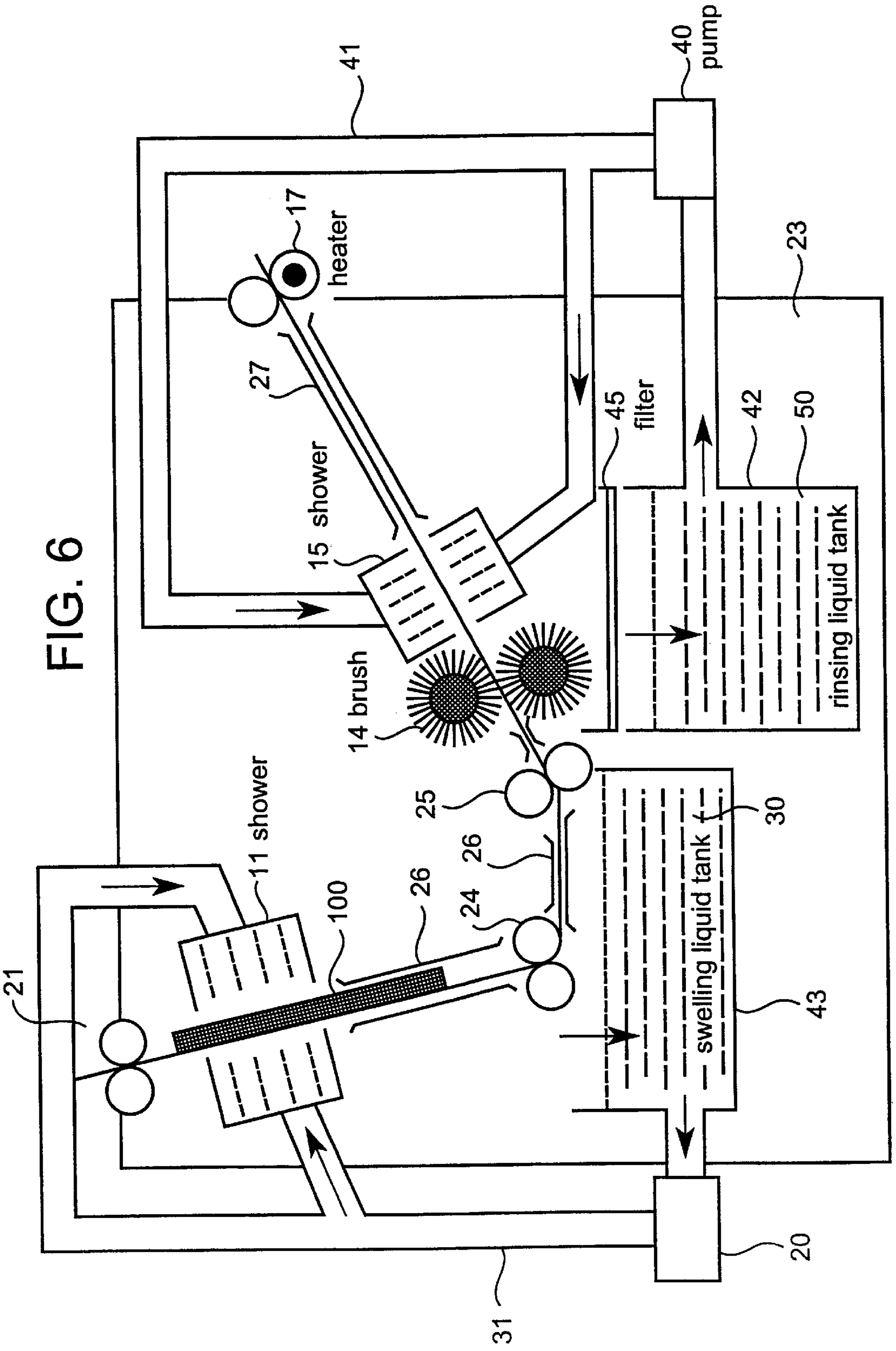
FIG. 6 is a schematic view showing one example of a cleaning apparatus.

FIG. 6 is a diagram showing another embodiment of the cleaning apparatus. In this apparatus, a swelling liquid tank 43, for accommodating a liquid 30 for swelling the image-recording medium, and a rinsing liquid tank 42, for accommodating a liquid for cleaning the image-recording medium after its surface has been rubbed by a brush 14, are provided independently of each other. The liquid 30 accommodated in the swelling liquid tank 43 is pumped up by a pump 20 equipped with a filter, and fed through a pipe 31 to the shower 11 where the liquid is sprayed for a prescribed period of time or in a prescribed quantity over the image-recording medium 100 being fed by a paper feed roller 21. The image-recording medium is transported to a brushing region 14 via a guide 26 and transport rollers 24 and 25. The swelling-liquid sprayed on the image-recording medium from the shower 11 drops downward and is returned to the swelling liquid tank 43, located downward of the shower 11, and the liquid is thus circulated for reuse.

The image-recording medium 100 from which the printed material has been removed by the brush 14 is transported to a shower 15 where the cleaning shower 15 is supplied to the surface of the image-recording medium. A rinsing liquid 50 accommodated in the rinsing liquid tank 42 is pumped up by a pump 40 equipped with a filter, and supplied as the cleaning shower to the shower region through a pipe 41. The printed material scraped off by the brush and the printed material washed off by the rinsing liquid fall onto a filter 45 provided above the rinsing liquid tank, while the cleaning shower liquid falling from the shower region also drops onto the filter; the printed material is filtered out, and the rinsing liquid is returned to the tank 42 and circulated for reuse.

The image-recording medium passed through the shower region is transported via a guide 27 and is finally dried by a drying roller 17 with a built-in heater and discharged to the outside of the apparatus.

EXAMPLE 1

Base member: A polyethylene terephthalate (PET) sheet with a thickness of 100 $\mu$m was used as a base member.

Intermediate layer: Five grams of a melamine-formaldehyde resin (SUMIREZ 613: made by Sumitomo Kagaku K.K.) and 0.1 g of polyoxyethylene nonyl phenyl ether were added to 100 g of an urethane-resin-water-dispersion (HUX-232; made by Asahidenka K.K.) and stirred for five minutes. The resulting solution was applied onto the base member by a bar coater, heated at 120° C. for five minutes and subjected to a corona discharge treatment to form an intermediate layer of 5 $\mu$m thickness.

Surface phase: A resin solution was prepared by dissolving 16 g of anion-modified polyvinyl alcohol KL-318 (made by Kuraray K.K.) In 184 g of water. The resin solution was added with 3.2 g of epoxy crosslinking agent (Dinacol EX-313; made by Nagase Kasei K.K.), 0.4 g of polyoxyethylene nonyl phenyl ether and 1 g of silica fine particles (Sylysia 450; made by Fuji Sirisia K.K.), and stirred for 15 minutes (the number of hydroxy groups in the resin: the number of glycidyl groups of the crosslinking agent=14:1).

The resulting solution was applied onto the intermediate layer by a bar coater, and heated at 120° C. for 2 hours to form a surface layer of 9 μm thickness.

The laminated sheet thus obtained is referred to Recording Medium 1. The recording medium 1 was immersed in distilled water for 10 minutes. A difference of thickness between pre-immersion and post-immersion was measured by a micrometer. A value of the difference is referred to a saturated swelling amount in the direction of thickness. Recording Medium 1 had 10 μm in a saturated swelling amount in the direction of thickness.

Recording media obtained in the following Examples and Comparative Examples, the immersion time was set to 10 minutes, because the differences of thickness in the direction of thickness were saturated in 10 minute immersion. This immersion time is adjustable depending on time required to be saturated, if a swelling rate is much different.

EXAMPLE 2

A recording medium was prepared in a manner similar to Example 1, except that 0.8 g of epoxy crosslinking agent (Dinacol EX-313; made by Nagase Kasei K.K) contained in the resin solution for forming a surface layer was added instead of 3.2 g in Example 1 (the number of hydroxy groups in the resin: the number of glycidyl groups of the crosslinking agent=58:1). The resultant recording medium is referred to as Recording Medium 2. A thickness of the surface layer was 9 μm.

Recording Medium 2 had 15 μm in a saturated swelling amount in the direction of thickness.

EXAMPLE 3

The same base member and intermediate layer as Example 1 were used.

A surface layer was prepared as follows.

A resin solution was prepared by dissolving 16 g of anion-modified polyvinyl alcohol KM-618 (made by Kuraray K.K.) in 184 g of water. The resin solution was added with 3.2 g of polyethylene glycol diglycidyl ether (Dinacol EX-832; made by Nagase Kasei K.K.), 0.4 g of polyoxyethylene nonyl phenyl ether and 1 g of silica fine particles (Sylysia 450; made by Fuji Sirisia K.K.), and stirred for 15 minutes (the number of hydroxy groups in the resin: the number of glycidyl groups of the crosslinking agent=29:1).

The resulting solution was applied onto the intermediate layer by a bar coater, and heated at 120° C. for 2 hours to form a surface layer of 7 μm thickness.

The resultant recording medium is referred to Recording Medium 3. Recording Medium 3 had 6 μm in a saturated swelling amount in the direction of thickness.

EXAMPLE 4

A recording medium was prepared in a manner similar to Example 1, except that the application conditions of the bar coater were changed so that the thickness of a surface layer could be 4 μm (the number of hydroxy groups in the resin the number of glycidyl groups of the crosslinking agent=14:1). The resultant recording medium is referred to Recording Medium 4. Recording Medium 4 had 4 μm in saturated swelling amount in the direction of thickness.

EXAMPLE 5

A recording medium was prepared in a manner similar to Example 2, except that the application conditions of the bar coater were changed so that the thickness of a surface layer could be 20 μm (the number of hydroxy groups in the resin: the number of glycidyl groups of the crosslinking agent=58:1). The resultant recording medium is referred to Recording Medium 5. Recording Medium 5 had 25 μm in a saturated swelling amount in the direction of thickness.

COMPARATIVE EXAMPLE 1

A recording medium was prepared in a manner similar to Example 1, except that 0.1 g of epoxy crosslinking agent (Dinacol EX-313; made by Nagase Kasei K.K.) contained in the resin solution for forming a surface layer was added instead of 3.2 g in Example 1, and that the application conditions of the bar coated were changed so that the thickness of a surface layer could be 20 μm (the number of hydroxy groups in the resin: the number of glycidyl groups of the crosslinking agent=450:1). The resultant recording medium is referred to as Recording Medium 6. Recording Medium 6 had 27 μm in a saturated swelling amount in the direction of thickness.

COMPARATIVE EXAMPLE 2

A recording medium was prepared in a manner similar to Example 1, except that 6.4 g of epoxy crosslinking agent (Dinacol EX-313; made by Nagase Kasei K.K.) contained in the resin solution for forming a surface layer was added instead of 3.2 g in Example 1, and that the application conditions of the bar coated were changed so that the thickness of a surface layer could be 4 μm (the number of hydroxy groups in the resin: the number of glycidyl groups of the crosslinking agent=4.7:1). The resultant recording medium is referred to as Recording Medium 7. Recording Medium 7 had 2 μm in a saturated swelling amount in the direction of thickness.

Evaluation

Images were formed on the image-recording media obtained in Examples 1 to 5 and Comparative Examples 1 and 2 by use of a laser beam printer (LP-1700; made by Epson K.K.) available in the market.

Copied images formed on the image-recording media were removed by use of the apparatus of FIG. 4, to evaluate printed-image-removing properties. The evaluation was made on toner-removed ratio after 3 minutes of immersion from supply of water. The evaluation was ranked as follows.

Toner-removing ratio of:

95% or more; ⊙

90% or more and less than 95%; ○

80% or more and less than 90%; Δ less than 80%; X

The results are summarized in Table 1.

The operating conditions of the apparatus of FIG. 4 were as follows:

Brushing roller;the brush roller having a metal core diameter of 12 mm and having nylon brushing hair with length of 10 mm and thickness of 30 μm Water temperature in tank: 30° C.

Brush-rotational speed: 30 cm/second

Heat roller temperature: 110° C.

After the process of copy→toner removal was repeated 5 times, an eluting ratio of the surface layer to water was calculated to evaluate degradation degree with respect to repetition use. The eluting ratio was calculated in accordance with the following formula:

$$\text{Eluting ratio}(\%)=(A-B)/C\times 100$$

in which A represents an initial thickness of recording medium,

B represents a thickness of recording medium after the process was repeated 5 times, C represents an initial thickness of surface layer.

Measurement of thickness was made by a micrometer. The initial thickness of surface layer was the one referred to in the preparation of the samples in Examples or Comparative Examples.

The eluting ratio was ranked as follows:

| | |
|---|---|
| 5% or less; | ◎ |
| 10% or less | ○ |
| 20% or less | Δ |
| more than 20% | X |

The rank of Δ or better is acceptable. The results are summarized in Table 1.

TABLE 1

| | Layer thickness of surface layer (μm) | Addition amount of crosslinking agent* (parts by weight) | Saturated swelling amount (μm) | Image-removing properties | Durability |
|---|---|---|---|---|---|
| Ex. 1 | 9 | 20 | 10 | ◎ | ◎ |
| Ex. 2 | 9 | 5 | 15 | ◎ | ○ |
| Ex. 3 | 6 | 20 | 6 | ○ | ◎ |
| Ex. 4 | 4 | 20 | 4 | Δ | ◎ |
| Ex. 5 | 20 | 5 | 25 | ◎ | Δ |
| Com. Ex. 1 | 20 | 0.63 | 27 | ◎ | X |
| Com. Ex. 2 | 4 | 60 | 2 | X | ◎ |

*Addition amount of crosslinking agent is based on 100 parts by weight of water-soluble resin.

EXAMPLE 6

Preparation of Resin Aqueous Solution A

| | |
|---|---|
| Hydroxyethyl acrylate | 16 parts by weight |
| Quaternary dimethylaminoethyl methacrylate | 4 parts by weight |
| 2,2'-azobis(2-amidinopropane)dihydrochloride | 0.01 part by weight |
| Pure water | 180 parts by weight |

The above ingredients were put into a separable flask, mixed, stirred to react at 80° C. for 1 hour under nitrogen atmosphere. A resin aqueous solution A (10%) was obtained. The mole ratio of hydroxyethyl acrylate and quaternary dimethylaminoethyl methacrylate was 88:12.

Base member: A polyethylene terephthalate (PET) sheet with a thickness of 100 μm was used as a base member.

Intermediate Layer: Polycarbonate resin (14 g) was dissolved in 1,4-dioxane (86 g) to give a resin solution. One gram of a melamine-formaldehyde resin (SUMIREZ 613: made by Sumitomo Kagaku K.K.) was added to the above obtained solution. The resulting solution was applied onto the base member by a bar coater, heated at 80° C. for five minutes and subjected to a corona discharge treatment to form an intermediate layer of 3 μm thickness.

Surface Layer: Dimethylol urea (0.4 g) as a crosslinking agent, 0.6 g of ammonium chloride and 0.2 g of polyoxyethylene nonyl phenyl ether as a surface active agent were added to 200 g of the resin aqueous solution A (the number of hydroxy groups in resin: the number of methlol groups in crosslinking agent=20:1).

The resulting solution was applied onto the intermediate layer by a bar coater, and heated at 120° C. for 2 hours to form a surface layer of 9 μm thickness.

EXAMPLE 7

Preparation of Resin Aqueous Solution A

| | |
|---|---|
| Acrylic acid | 15 parts by weight |
| Sodium acrylate | 5 parts by weight |
| 2,2'-azobis(2-amidinopropane)dihydrochloride | 0.01 part by weight |
| Pure water | 180 parts by weight |

The above ingredients were put into a separable flask, mixed, stirred to react at 80° C. for 1 hour under nitrogen atmosphere. A resin aqueous solution B (10%) was obtained. The mole ratio of acrylic acid and sodium acrylate was 80:20.

Base member: A white PET sheet with a thickness of 80 μm was used as a base member.

Intermediate layer: Five grams of a melamine-formaldehyde resin (SUMIREZ 613: made by Sumitomo Kagaku K.K.) and 0.1 g of polyoxyethylene nonyl phenyl ether (nonypole 60: made by Sanyo Kagaku K.K.) were added to 100 g of an urethane-resin-water-dispersion (HUX-260; made by Asahidenka K.K.) and stirred. Then, the resulting solution was applied onto the base member by a bar coater and heated at 120° C. for five minutes.

Surface Layer: Polyethylene glycol diglycidyl ether (Dinacol EX-810; made by Nagase Kasei K.K.) (3.3 g) as a crosslinking agent, 0.2 g of tetramethylammonium chloride and 0.2 g of polyoxyethylene nonyl phenyl ether as a surface active agent were added to 200 g of the resin aqueous solution B (the number of carboxyl groups in resin: the number of glycidyl groups in crosslinking agent=7:1).

The resulting solution was applied onto the intermediate layer by a bar coater, and heated at 120° C. for 2 hours to form a surface layer of 9 μm thickness.

EXAMPLE 8

Base member: A sheet of PPC paper having 80 μm thickness was used as a base member.

Intermediate layer: The same intermediate layer as Example 7 was formed.

Surface layer: An aqueous resin solution was prepared by dissolving 16 g of anion-modified polyvinyl alcohol KM-618 (made by Kuraray K.K.) in 184 of water. The resin solution was added with 0.6 g of glycerine polyglycidyl ether (Dinacol EX-313; made by Nagase Kasei K.K.) and 0.2 g of polyoxyethylene nonyl phenyl ether, and stirred for 5 minutes (the number of hydroxy groups in the resin: the number of glycidyl groups of the crosslinking agent=80:1).

The resulting solution was applied onto the intermediate layer by a bar coater, and heated at 120° C. for 2 hours to form a surface layer of 9 μm thickness.

COMPARATIVE EXAMPLE 3

Base member: A PET sheet with 150 μm thickness was used as a base member.

Intermediate layer: The same intermediate layer as Example 7 was formed.

Surface layer: An aqueous resin solution was prepared by dissolving 16 g of cation-modified polyvinyl alcohol CM-318 (made by Kuraray K.K.) in 184 of water. The resin solution was added with 0.12 g of dimethylol urea and 0.2 g of polyoxyethylene nonyl phenyl ether as a surface active agent, and stirred for 5 minutes (the number of hydroxy groups in the resin: the number of methylol groups of the crosslinking agent=150:1).

Evaluation (Removing Rate (initial and after durability test)

Images were formed on the image-recording media obtained in Examples 6 to 8 and Comparative Example 3 by use of a laser beam printer (LP-1700; made by Epson K.K.) available in the market.

Copied images formed on the image-recording media were removed by use of the apparatus of FIG. 4, to evaluate an image-removing rate. The image-removing rate was evaluated to measure an immersion time taken to be in good conditions for image-removal after water was supplied. The evaluation was ranked as follows;

◎: 95% or more of image-removal could be carried out in 1 minute;

○: 95% or more of image-removal could be carried out in 2 minutes;

X: more than 2 minutes was taken to remove 95% or more of image-removal.

After the process of copy→toner removal was repeated 5 times, the same evaluation as above mentioned was made again to evaluate an image-removing rate after repetition. At the same time, layer-separation was evaluated. When the surface layer was kept, the evaluation was ranked as "○". When the surface layer was not kept, the evaluation was ranked as "X".

The operating conditions of the apparatus of FIG. 4 were as follows:

Brushing roller; the brush roller having a metal core diameter of 12 mm and having nylon brushing hair with length of 10 mm and thickness of 30μm Water temperature in tank: 30° C.

paper-feeding speed: 1 cm/second

Brush-rotational speed/paper-feeding speed: 30 Heat roller temperature: 110° C.

The results are summarized in Table 2

TABLE 2

| | Image-removing rate | | |
|---|---|---|---|
| | Initial | After repetition | Layer separation |
| Example 6 | ◎ | ◎ | ○ |
| Example 7 | ◎ | ○ | ○ |
| Example 8 | ◎ | ◎ | ○ |
| Comparative example 3 | ○ | X | X |

Although the present invention has been fully described by way of examples, it is to be noted that the various changes and modification will be apparent to those skilled in the art.

Therefore, unless otherwise such changes and modifications depart from the scope of the present invention, they should be construed as being included therein.

What is claimed is:

1. A recyclable recording medium comprising;

a base member, a surface layer comprising a water-swelling resin and a surface active agent, and having a thickness of 3 to 30 μm, the water-swelling resin formed by crosslinking a water-soluble resin with a crosslinking agent, the surface layer containing the surface active agent at an amount of 0.1 to 20% by weight relative to the water-soluble resin, the water-soluble resin having a first functional group crosslinkable with the crosslinking agent and a second ionic functional group, a ratio of the number of functional groups of the crosslinking agent to the number of the first functional groups being within the range between 1/100 and 1/5;

a saturated swelling amount in the direction of thickness is 4 to 25 μm when the recyclable recording medium is immersed in an aqueous medium.

2. The recyclable recording medium of claim 1, in which the water-swelling resin contains a functional group having an active hydrogen atom.

3. The recyclable recording medium of claim 2, in which the water-swelling resin contains a functional group having an active hydrogen atom and an ionic group.

4. The recyclable recording medium of claim 1, in which the crosslinking agent is added at an amount of 1 to 50 parts by weight on the basis of 100 parts by weight of the water-soluble resin.

5. The recyclable recording medium of claim 4, in which the crosslinking agent is selected from the group consisting of isocyanate compounds, methylol compounds, aldehyde compounds, epoxy compounds, aziridines, dihydrazides and a mixture thereof.

6. The recyclable recording medium of claim 1, in which the saturated swelling amount in the direction of thickness is 5 to 20 μm and the thickness of the surface layer is within the range between 5 and 20 μm.

7. The recyclable recording medium of claim 1, in which the surface layer contains a surface active agent at an amount of 0.5 to 10% by weight relative to the water-soluble resin.

8. The recyclable recording medium of claim 1, in which the surface layer contains inorganic particles at an amount of 0.5 to 200 parts by weight on the basis of 100 parts by weight of the water-soluble resin.

9. The recyclable recording medium of claim 1, comprising an intermediate layer formed of a resin between the base member and the surface layer.

10. The recyclable recording medium of claim 9, in which the resin is selected from the group consisting of acrylic resins, styrene resins, polyester resins, polycarbonate resins, vinyl acetate resins, vinyl chloride resins, urethane resins.

11. The recyclable recording medium of claim 9, in which the intermediate layer contains a reactive compound having a functional group chemically bondable to the surface layer.

12. The recyclable recording medium of claim 9, in which the intermediate layer is subjected to a corona discharge treatment.

13. The recyclable recording medium of claim 1, in which the aqueous medium is a swelling solution used when the recyclable recording medium is recycled.

14. The recyclable recording medium according to claim 1, wherein the surface active agent is an anionic, cationic or nonionic surfactant.

15. A recyclable recording medium comprising;

a base member, a surface layer comprising a water-swelling resin formed by crosslinking a water-soluble resin with a crosslinking agent, and having a thickness of 3 to 30 μm;

the water-soluble resin having a first functional group crosslinkable with the crosslinking agent and a second ionic functional group, a ratio of the number of the functional groups of the crosslinking agent to the number of the first functional groups being within the range between 1/100 and 1/5.

16. The recyclable recording medium of claim 15, in which a ratio of the number of the functional groups of the crosslinking agent to the number of the first functional groups is within the range between 1/50 and 1/8.

17. The recyclable recording medium of claim 15, in which the surface layer contains a surface active agent at an amount of 0.1 to 20% by weight relative to the water-soluble resin.

18. The recyclable recording medium of claim 15, in which the surface layer contains inorganic particles at an amount of 0.5 to 200 parts by weight on the basis of 100 parts by weight of the water-soluble resin.

19. The recyclable recording medium of claim 15, comprising an intermediate layer formed of a resin between the base member and the surface layer.

20. The recyclable recording medium of claim 19, in which the resin is selected from the group consisting of acrylic resins, styrene resins, polyester resins, polycarbonate resins, vinyl acetate resins, vinyl chloride resins, urethane resins.

21. A recyclable recording medium comprising;

a base member, a surface layer comprising a water-swelling resin and inorganic particles, and having a thickness of 3 to 30 μm, the water-swelling resin formed by crosslinking a water-soluble resin with a crosslinking agent, the surface layer containing the inorganic particles at an amount of 0.5 to 200 parts by weight on the basis of 100 parts by weight of the water-soluble resin, the water-soluble resin having a first functional group crosslinkable with the crosslinking agent and a second ionic functional group, a ratio of the number of functional groups of the crosslinking agent to the number of the first functional groups being within the range between 1/100 and 1/5;

a saturated swelling amount in the direction of thickness is 4 to 25 μm when the recyclable recording medium is immersed in an aqueous medium.

22. A recyclable recording medium comprising;

a base member, a surface layer comprising a water-swelling resin, and having a thickness of 6 to 30 μm, the water-swelling resin formed by crosslinking a water-soluble resin with a crosslinking agent, the water-soluble resin having a first functional group crosslinkable with the crosslinking agent and a second ionic functional group, a ratio of the number of functional groups of the crosslinking agent to the number of the first functional groups being within the range between 1/100 and 1/5;

a saturated swelling amount in the direction of thickness is 6 to 25 μm when the recyclable recording medium is immersed in an aqueous medium.

23. A recyclable recording medium comprising;

a base member, a surface layer comprising a water-swelling resin, a surface active agent and inorganic particles, and having a thickness of 3 to 30 μm, the water-swelling resin formed by crosslinking a water-soluble resin with a crosslinking agent, the surface layer containing the surface active agent at an amount of 0.1 to 20% by weight relative to the water-soluble resin and containing the inorganic particles at an amount of 0.5 to 200 parts by weight on the basis of 100 parts by weight of the water-soluble resin, the water-soluble resin having a first functional group crosslinkable with the crosslinking agent and a second ionic functional group, a ratio of the number of functional groups of the crosslinking agent to the number of the first functional groups being within the range between 1/100 and 1/5;

a saturated swelling amount in the direction of thickness is a sufficient amount for removing a printing material from the surface layer and for preventing a separation of the surface layer from the base member when the recyclable recording medium is immersed in an aqueous medium.

24. The recyclable recording medium according to claim 23, wherein the surface active agent is an anionic, cationic or nonionic surfactant.

25. A recyclable member comprising:

a base member, a surface layer formed on the base member, said surface layer comprising a water-swelling resin formed by cross-linking a water-soluble resin with a cross-linking agent, and having a thickness of 3 to 30 μm;

the water-soluble resin having a first functional group cross-linkable with the cross-linking agent and a second ionic functional group, a ratio of the number of the functional groups of the cross-linking agent to the number of the first functional groups being within the range between 1/100 and 1/5.

26. The recyclable member of claim 25, wherein the ratio of the number of the functional groups of the cross-linking agent to the number of the first functional groups is within the range between 1/50 and 1/8.

27. The recyclable member of claim 25, wherein the surface layer contains a surface active agent at an amount of 0.1 to 20% by weight relative to the water-soluble resin.

28. The recyclable member of claim 25, wherein the surface layer contains inorganic particles at an amount of 0.5 to 200 parts by weight on the basis of 100 parts by weight of the water-soluble resin.

29. The recyclable member of claim 25, further comprising an intermediate layer formed of a resin between the base member and the surface layer.

30. The recyclable member of claim 29, in which the intermediate layer resin is selected from the group consisting of acrylic resins, styrene resins, polyester resins, polycarbonate resins, vinyl acetate resins, vinyl chloride resins and urethane resins.

31. A recyclable member comprising:

a base member, a surface layer formed on the base member, said surface layer comprising a water-swelling resin formed by cross-linking a water-soluble resin with a cross-linking agent, a surface active agent and inorganic particles, and having a thickness of 3 to 30 μm, said surface layer containing the surface active agent at an amount of 0.1 to 20% weight relative to the water-soluble resin and containing the inorganic particles at an amount of 0.5 to 200 parts by weight on the basis of 100 parts by weight of the water-soluble resin, said water-soluble resin having a first functional group cross-linkable with the cross-linking agent and a second ionic functional group, a ratio of the number of functional groups of the cross-linking agent to the number of the first functional groups being within the range between 1/100 and 1/5;

a saturated swelling amount in the direction of thickness is a sufficient amount for removing an adherent material from the surface layer and for preventing a separation of the surface layer from the base member when the recyclable member is immersed in aqueous medium.

32. The recyclable member of claim 31, wherein the surface active agent is an anionic, cationic or nonionic surfactant.

33. A recyclable member comprising:

a base member, a surface layer formed on the base member, said surface layer comprising a water-swelling resin and a surface active agent, and having a thickness of 3 to 30 $\mu$m, the water-swelling resin formed by cross-linking a water-soluble resin with a cross-linking agent, the surface layer containing the surface active agent at an amount of 0.1 to 20% weight relative to the water-soluble resin, the water-soluble resin having a first functional group cross-linkable with the cross-linking agent and a second ionic functional group, a ratio of the number of the functional groups of the cross-linking agent to the number of the first functional groups being within the range between 1/100 and 1/5;

a saturated swelling amount in the direction of thickness is 4 to 25 $\mu$m when the recyclable member is immersed in an aqueous medium.

34. A recyclable member comprising:

a base member, a surface layer formed on the base layer, said surface layer comprising a water-swelling resin and inorganic particles, and having a thickness of 3 to 30 $\mu$m, the water-swelling resin formed by cross-linking a water-soluble resin with the cross-linking agent, the surface layer containing the inorganic particles at an amount of 0.5 to 200 parts by weight on the basis of 100 parts by weight of the water-soluble resin, the water-soluble resin has a first functional group cross-linkable with the cross-linking agent and a second ionic functional group, a ratio of the number of the functional groups of the cross-linking agent to the number of the first functional groups being within the ratio between 1/100 and 1/5;

a saturated swelling amount in the direction of thickness is 4 to 25 $\mu$m when the recyclable member is immersed in an aqueous medium.

35. A recyclable member comprising:

a base member, a surface layer formed on the base layer, said surface layer comprises a water-swelling resin and has a thickness of 6 to 30 $\mu$m, the water-swelling resin formed by cross-linking a water-soluble resin with a cross-linking agent, the water-soluble resin having a first functional group cross-linkable with the cross-linking agent and a second ionic functional group, a ratio of the number of the functional groups of the cross-linking agent to the number of the first functional groups being within the range between 1/100 and 1/5, and a saturated swelling amount in the direction of thickness is 6 to 25 $\mu$m when the recyclable member is immersed in an aqueous medium.

36. A water-swelling overcoat comprising:

a water-swelling resin and a surface active agent, wherein said water-swelling agent is formed by cross-linking a water-soluble resin with a cross-linking agent, said water-soluble resin having a first functional group cross-linkable with the cross-linking agent and a second ionic functional group, a ratio of the number of the functional groups of the cross-linking agent to the number of the first functional groups being within the range between 1/100 and 1/5, and wherein said water-swelling overcoat has a thickness of 3 to 30 $\mu$m.

37. A water-swelling overcoat comprising:

a water-swelling resin and inorganic particles, wherein said water-swelling agent is formed by cross-linking a water-soluble resin with a cross-linking agent, said water-soluble resin having a first functional group cross-linkable with the cross-linking agent and a second ionic functional group, a ratio of the number of the functional groups of the cross-linking agent to the number of the first functional groups being within the range between 1/100 and 1/5, and wherein said water-swelling overcoat has a thickness of 3 to 30 $\mu$m.

38. A water-swelling overcoat formed on a base member, comprising:

a water-swelling resin and a surface active agent, wherein said water-swelling resin is formed by cross-linking a water-soluble resin with a cross-linking agent, the water-soluble resin having a first functional group cross-linkable with the cross-linking agent and a second ionic functional group, a ratio of the number of the functional groups of the cross-linking agent to the number of the first functional groups being within the range between 1/100 and 1/5, and wherein said water-swelling overcoat has a thickness of 3 to 30 $\mu$m, and has a saturated swelling amount in the direction of thickness being a sufficient amount for removing an adherent material from the overcoat and for preventing a separation of the water-swelling overcoat from the base member when the recyclable member is immersed in an aqueous medium.

39. A water-swelling overcoat formed on a base member, comprising:

a water-swelling resin and inorganic particles, wherein said water-swelling resin is formed by cross-linking a water-soluble resin with a cross-linking agent, the water-soluble resin having a first functional group cross-linkable with the cross-linking agent and a second ionic functional group, a ratio of the number of the functional groups of the cross-linking agent to the number of the first functional groups being within the range between 1/100 and 1/5, and wherein said water-swelling overcoat has a thickness of 3 to 30 $\mu$m, and has a saturated swelling amount in the direction of thickness being a sufficient amount for removing an adherent material from the overcoat and for preventing a separation of the water-swelling overcoat from the base member when the recyclable member is immersed in an aqueous medium.

* * * * *